June 3, 1930.  P. E. FROLAND  1,761,442

FURNACE FOR THE PRODUCTION OF ALUMINUM

Filed March 1, 1928

INVENTOR.
Peder E. Froland
BY
ATTORNEY.

Patented June 3, 1930

1,761,442

UNITED STATES PATENT OFFICE

PEDER ELIASEN FRØLAND, OF HOYANGER, NORWAY

FURNACE FOR THE PRODUCTION OF ALUMINUM

Application filed March 1, 1928, Serial No. 258,337, and in Norway March 12, 1927.

In all furnaces for the production of aluminum now in use, the metal is produced by electrolysis of a molten charge containing alumina and various additional substances, such as fluorides etc. In these furnaces the current serves both for electrolysis of the molten charge and for maintaining the charge in a molten state. Further, it is quite common in these furnaces to use the bottom of the furnace as negative electrode or cathode, the current serving for both heating and electrolysis. The bottom consists of carbon, in most cases of a rammed composition of carbon and tar or the like. The connection between the conducting bottom and the current supply has been effected by embedding in the carbon mass iron bars or iron blocks, which extend outside the furnace and carry the connections for the current. This arrangement has however considerable drawbacks, in that the contact between the iron bars or blocks and the surrounding carbon mass very often becomes defective. This is probably due to the different coefficient of expansion of the carbon material and the iron cores, which leads to a loosening of the iron bars from the surrounding carbon, when the bottom is "working" as a consequence of repeated heatings and coolings.

This disadvantage is removed by my invention. To this purpose I make use of the arrangement that the connection between the carbon bottom and the current supply is established by means of a material of essentially the same composition as that of the bottom. This may be realized in various manners. If a stamped carbon bottom is used I conveniently during the ramming operation embed in the bottom a core of carbon material for instance a carbon electrode, which extends outside the furnace through a suitable opening in the furnace wall, and to this projecting core, the connection for the current is secured. It is also possible to prepare the furnace bottom with its projection in one piece in similar manner as carbon electrodes are prepared and subsequently place the finished carbon bottom in the furnace casing on the usual insulating layer of asbestos, brick-work or the like. As the projecting carbon core is of course not so resistant to mechanical stresses as the iron bars previously used a break of the carbon core may occur by careless working. To meet the consequences of an eventual rupture of the carbon core I provide according to my invention a spare connection for current to the bottom.

To this purpose I provide suitable recesses, grooves or the like in the lower part of the bottom, preferably on the underside of the latter. These recesses contain metal, preferably aluminum. To provide the bottom with such metal enclosures I may place the latter during the ramming of the bottom or in a similar manner place them in a furnace bottom which is separately moulded. Or the metal may be introduced in the molten state into the recesses after the bottom has been prepared in the furnace or after the separately dressed bottom has been placed in the furnace.

These metal masses on the underside of the bottom have projecting ends which are connected with the current supply. If therefore a break of the carbon core carrying the current connection should occur, this will not cause the formation of an arc at the place of fracture and stop the supply of current. The furnace will now receive current through the metal in the recesses until the furnace may be properly switched off for replacing.

The invention is diagrammatically illustrated in the accompanying drawing.

Figure 1:
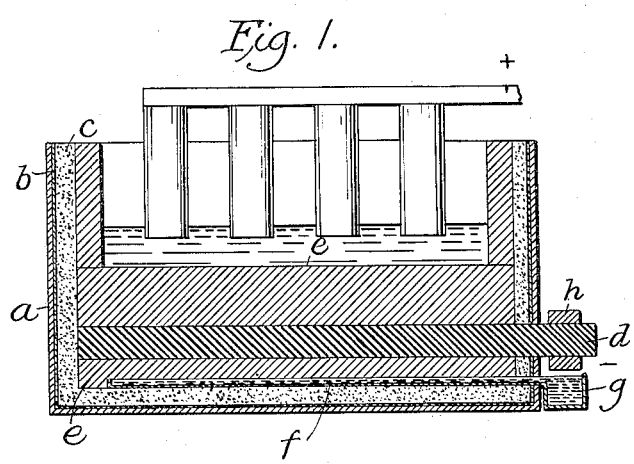
Fig. 1 shows a vertical longitudinal section of a furnace.
Figure 2:
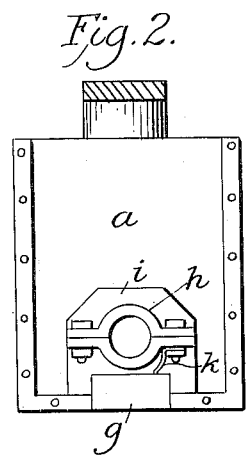
Fig. 2 shows an end view of the same.

$a$ is the iron casing, which by means of suitable material $b$, $c$ is insulated from the tamped material $e$, which constitutes the conducting furnace bottom and surrounds the carbon core $d$, respectively is moulded in one piece with this core. The core $d$ extends through an opening $i$ in the furnace casing and carries outside the furnace the current lead $h$. On the underside of the bottom $e$ reesses $f$ are provided which contain metal. If the metal is to be introduced in the molten state into the recesses $f$ a suitable container $g$ is provided outside the furnace which container communicates with the recesses or grooves *f*. The latter are filled with metal by pouring molten metal into the container *g*. The metal in this container is electrically connected with the lead *h* in some suitable manner as for instance by means of a flexible cable *k* which is attached to the container or to the metal in the container.

By the arrangement above described I obtain a perfectly secure electrical connection between the current lead *h* and the bottom *e*. Besides this further advantages are obtained. In previous aluminum furnaces with iron enclosures in the bottom it is a well known inconvenience, that when the bottom is gradually corroded and used up the bath of molten aluminum will after a shorter or longer period reach the iron enclosures. The aluminum will then take up iron and give a metal of inferior quality.

According to my invention I avoid the contamination of the product with iron and the furnace may be worked for a much longer period before a renewal of the bottom is required.

I claim:

1. In an electric furnace for the production of aluminum, a carbon bottom, a core of similar material embedded therein and extending outside the furnace for attachment to a source of current, and metal masses in the carbon bottom extending outside the furnace for attachment to the same current source.

2. In an electric furnace for the production of aluminum, a carbon bottom having a projection of similar material extending outside the furnace for connection to a current source as cathode, and aluminum masses in the bottom and extending outside the furnace for connection to the same current source.

3. In an electric furnace for the production of aluminum, a carbon bottom provided with a cathode terminal of the same material extending outside the furnace, said bottom having recesses extending across the bottom and metal masses filling said recesses and extending outside the bottom also, for cathode connection to the source of current.

4. In an electric furnace for the production of aluminum, a carbon bottom having an extension outside the furnace for connection as cathode to a current source, recesses in the underside of the bottom, a container outside the furnace and communicating with the recesses, and molten aluminum poured into said container and recesses also for cathode connection to the current source.

5. In an electric furnace for the production of aluminum, a tamped carbon bottom, a core embedded therein of electrode carbon extending outside the furnace for cathode connection to a source of current, the underside of the bottom having recesses extending across it, a container outside the recesses and communicating with the core, and metal filling said container and recesses forming metal bars in the recesses acting as auxiliary cathodes.

In testimony that I claim the foregoing as my invention I have signed my name.

PEDER ELIASEN FROLAND.